United States Patent Office — 2,968,562 — Patented Jan. 17, 1961

2,968,562

SHORTENING

Charles Jack Houser, Champaign, Ill., assignor to National Dairy Products Corporation, New York, N.Y., a corporation of Delaware No Drawing. Filed Jan. 21, 1958, Ser. No. 710,175

3 Claims. (Cl. 99—118)

The present invention relates generally to extension of the use of edible liquid oils and, more particularly, it relates to a flowable or liquid shortening made from edible liquid oils for baking, frying and other food purposes. The invention not only relates to a flowable shortening product but also is directed to processes for making and using such a product.

As is well known, many shortenings are on the market today, and have been marketed for many years, for baking and cooking purposes. The more common shortenings are plastic, or semi-solid, in character and are prepared from hydrogenated vegetable oils, such as cottonseed oil and soy bean oil. To these shortenings are frequently added so-called emulsifiers in the form of mono- and di-glycerides, and such shortenings are referred to as emulsifier-type shortenings. These shortenings are good for baking cakes, frying and other cooking purposes. However, such shortenings are not pourable or flowable at room temperatures, and, consequently, are measured for baking and cooking purposes with some difficulty.

Another plastic shortening of this same general type has been and is being marketed, this shortening being made by "rearrangement" of lard. This shortening has much the same advantages as the hydrogenated vegetable oils mentioned above but, at the same time, has the inherent disadvantages of the plastic shortenings.

There are various liquid shortenings which have been and are commercially available. These liquid shortenings have had several disadvantages and, in this connection, these shortenings have not provided cakes with the volume, grain structure and/or eating qualities equivalent to that provided with the use of plastic shortenings. Furthermore, some of the available liquid shortenings on the market are not storage stable and layer or separate upon standing, thereby necessitating shaking or stirring prior to use. Accordingly, while readily measurable fats have been provided by presently available liquid shortenings, they have not provided a product which can be used to make cakes which are equivalent to those made with plastic shortenings. As a result, liquid shortenings have not generally had wide acceptance.

It has sometimes been said that liquid edible oils have shortening properties. However, it is generally recognized in the baking industry that such liquid oils have substantially inferior cake making properties when compared with emulsifier-type shortenings. In addition, the cake making properties of liquid oil are less than the cake making properties of those liquid shortenings now being marketed for use in place of emulsifier-type shortenings.

Therefore, it is a main object of this invention to provide means for improving the properties of edible liquid oils, and a more particular object is the provision of an improved liquid shortening and methods for making and using such a shortening. It is a further object of the invention to provide a liquid shortening which does not separate into layers, thereby providing a uniform product. It is also an object of this invention to provide a liquid shortening which can be used in cakes to provide a cake having a volume, grain structure and eating qualities like cakes made from plastic shortenings. It is still another object of this invention to provide a liquid shortening product which can be used in place of emulsifier-type shortenings in various recipes and for frying, which shortening, at the same time, can be conveniently stored and handled in a liquid state.

Still further objects and advantages of this invention will become apparent by reference to the following description.

In accordance with the invention, the liquid shortening comprises a base oil to which is added a surface active agent along with an oil soluble reaction product of glycerine with higher fatty acids and a water soluble acid, the water soluble acid having the following general formula:

$$R(OH)_n(COOH)_n$$

In the foregoing formula, R represents hydrocarbon groups having from 1 to 5 carbon atoms and $n$ is 1 or 2.

The base oil is present in an amount from about 94 percent to about 98 percent, the surface active agent being present in an amount of about .1 percent to about 2 percent. The reaction product is present in an amount of about 2 percent to about 6 percent, and the sum of the percentages of the surface active agent and the reaction product are in the range of from about 2 percent to about 8 percent. Higher percentages of the reaction product do not provide increased benefit and, primarily because of their cost, need not be used at higher levels.

The base oil is a liquid oil, such as cottonseed oil, peanut oil, soy bean oil and corn oil and, in general, the oil will have an iodine value (I.V.) in excess of about 85 and will not contain excessive amounts of trisaturated glyceride compounds. This iodine value is primarily of significance to indicate the liquidity of the oil.

The base oil preferably should not cloud at low temperatures and, in this connection, should have a "cold test" in excess of 5.5 hours. The cold test is a standard test in the edible oil industry and a standard procedure is provided by the American Oil Chemists Society. In this test, an oil sample is placed in a four ounce bottle which, in turn, is placed in a bath of melting ice at 32° F. The base oil used in the practice of this invention should remain clear at the end of 5.5 hours in the bath, i.e., have a cold test in excess of about 5.5 hours. Of course, crystal inhibitors or retarders may be added to the base oil to inhibit phase separation and the base oil, by itself, may have a cold test of less than 5.5 hours, provided, of course, that the crystal inhibitor is added to the oil.

The surface active agent should be substantially oil soluble or, at least, form a stable suspension in oil at the levels used and may be derived from the following classes of compounds or their equivalents:

(1) Partial esters of the fatty acids with hexahydric alcohols or their anhydrides (2) Polyoxyalkylene derivatives of the partial esters of the fatty acids with hexahydric alcohols or their anhydrides (3) Ester-ethers resulting from the reaction of fatty acids with alkylene oxides Particular compounds which have provided satisfactory results include:

(1) Polyoxypropylene mannitol dioleate
(2) Polyoxyethylene sorbitan tristearate
(3) Polyoxyethylene sorbitan monooleate
(4) Sorbitan monostearate
(5) Sorbitan sesquioleate
(6) Polyoxyethylene monostearate
(7) Polyoxyethylene sorbitan monostearate As has been previously indicated, the amount of surface active agent should be in the range of from about .1 percent to about 2 percent to provide the desired results of this invention.

As has been above indicated, the reaction product which is utilized in the liquid shortening of this invention may be prepared from various compounds. The fatty acid radicals in the reaction product should have chain lengths in excess of 12 in order to provide satisfactory practice of this invention. The fatty acid radicals of this invention are preferably provided from palmitic acid or higher homologues.

The fatty acid chains should be substantially saturated though some results are obtained when the I.V. of the fatty acid portion is as high as 35. In general, the results obtained are inversely proportional to the iodine value. In other words, as the iodine value increases, less desired results are obtained.

Various water soluble acids may be used in preparing the reaction product for use in the liquid shortening and, in this connection, lactic acid is the preferred acid. However, other acids, such as glycolic acid, sarcolactic acid, hydracrylic acid, hydroxybutyric acid and malic acid, may be utilized. The acids may have an odd or even number of carbon atoms in their chain and they may be straight chain or branch chain compounds.

As has been indicated, the best results have been obtained with lactic acid and, in this connection, the ratio of the lactic acid to fatty acid in the preparation of the reaction product is preferably in the range of .4:1 to 2.5:1. The total acid to glycerine ratio in the preparation of the reaction product is preferably in the range of 1.5:1 to 3.0:1.

A reaction product may be obtained by the following procedure:

Two gram moles (524 gm.) of a mixture of fatty acids comprising 70 percent palmitic acid and 2 gram moles (206 gm.) of glycerine (90 percent pure) were heated to 90° C. while agitating with nitrogen and 1⅓ gram moles (140 gm.) of lactic acid (85 percent pure) were added. The system was evacuated to between 10 and 12 inches of mercury relative to 30 inches of mercury and refluxed at 185° C. for six hours while purging with nitrogen to remove water formed in the reaction. The condenser was held at 60° C. in order to pass water vapors but reflux the lactic acid. The vacuum was then increased to between 20 and 22 inches of mercury and held for three hours, after which the temperature was lowered to 90° C., the vacuum broken and the batch washed three times with 3 percent sodium sulfate solution. The product was then dried at 140° C. under vacuum with a nitrogen purge and filtered.

A reaction product may also be made by the following procedure:

Using a reflux apparatus as above, 296 gms. of completely hydrogenated edible tallow glycerides were heated to 165° C. and to it were added 67 gms. of glycerine (90 percent pure) containing 0.8 gm. of sodium hydroxide dissolved in water. (This mixture gives one gram mole of fatty acids and one gram mole of glycerine.) This mixture was held at 165° C. and agitated under 29 inches of mercury vacuum (relative to 30 inches of mercury) for 30 minutes, after which 1⅓ gram moles (140 gms.) of lactic acid (85 percent pure) were added and the resulting mixture agitated for two hours at 185° C. under 22 inches vacuum. The batch was cooled to 90° C., the vacuum broken and the batch washed three times with 3 percent sodium sulfate solution. The resulting material was dried at 140° C. under vacuum, using a nitrogen purge, and filtered.

*Example I*

As a specific example of the practice of this invention, cottonseed oil was utilized as the base oil and a lactated glyceride was employed at a level of 4.0 percent, the lactated glyceride being prepared generally in accordance with the second procedure above described. The cottonseed oil had an I.V. of 105 and a cold test of 17.0 hours. In the lactated glyceride, the mole ratio of lactic acid to fatty acid was about .59:1. The total acid to glycerine ratio was 2.42:1. The surface active agent was added to a level of .45 percent and, in this connection, the surface active agent comprised polyoxypropylene mannitol dioleate. The liquid shortening also comprised .06 percent aluminum tripalmitate.

A white cake was prepared from the liquid shortening, the cake batter having a specific gravity of .80, and the resulting cake volume was 1220 cubic centimeters.

The white cake test, which has been utilized in evaluating the liquid shortenings of this invention, is a somewhat standard test for evaluating emulsifier-type shortenings. This test is one of the more difficult tests for shortenings and, the formula employed is for a richer type cake which contains a high proportion of sugar relative to flour.

The white cake is prepared by making a dry mix comprising the following ingredients in the stated amounts:

41.9 parts flour
52.1 parts sugar
1.0 part salt
2.5 parts baking powder

To 48.7 parts of the dry mix is added 10.0 parts of shortening and 16.0 parts of liquid, whole homogenized milk. The dry mix, shortening and milk are blended together, and to the blend is added a mix of 12.0 parts of egg white and 8.0 parts of liquid, whole homogenized milk. This complete mixture is then blended to a satisfactory batter and the cake batter specific gravity measured.

The batter, in an amount of 420 grams is placed in an 8 inch cake pan and is heated in an oven at 350° F. After baking, the volume is measured by a standard procedure.

The white cake of this example had good eating characteristics and good texture.

By way of comparison, the use of cottonseed oil gave a cake batter having a specific gravity of 1.11, the cake having a volume of 940 cubic centimeters. Two commercially available liquid shortenings gave batters having specific gravities of 1.05 and 1.12, which gave cakes having volumes of 1040 and 935 cubic centimeters.

*Example II*

As another example, the same mixture, with corresponding amounts of material, was used as in the previous example except that the surface active agent comprised polyoxyethylene sorbitan tristearate. The liquid shortening provided a white cake batter having a specific gravity of .83 and a cake having a volume of 1220 cubic centimeters. As in the previous example, the cake had good eating characteristics and good texture.

*Example III*

As a further example, the same materials were used as in Example I, in the same proportions, except that the surface active agent comprised polyoxyethylene sorbitan monooleate. When the liquid shortening was utilized in the preparation of a white cake, the specific gravity of the batter was .86 and the cake volume was 1220 cubic centimeters. The cake had good eating qualities and good texture.

*Example IV*

In this example, the surface active agent comprised sorbitan monostearate, this agent being used in the same formula as in Example I to the exclusion of the surface active agent set forth in Example I. The batter of the cake had a specific gravity of .75 and the resulting cake had a volume of 1140 cubic centimeters. The cake had good eating qualities and good texture.

Example V

As a further example, the same formula was used as in Example 1 except that the surface active agent comprised sorbitan sesquioleate. The white cake produced by the use of the liquid shortening was from a batter having a specific gravity of .90 and the resulting cake had a volume of 1200 cubic centimeters.

Example VI

In this example, the surface active agent was polyoxyethylene monostearate, it being used in the same formula as in Example I. The white cake (batter specific gravity of .84) resulting from the use of this surface active agent had a volume of 1250 cubic centimeters and the cake had good eating and texture characteristics.

Example VII

In this example the surface active agent was polyoxyethylene sorbitan monostearate and the formula utilized in Example I was employed. The white cake was made from a batter having a specific gravity of .79 and the resulting cake had a volume of 1220 cubic centimeters. The cake had good eating and texture characteristics.

Example VIII

In this example, the same formula is utilized as in the case of Example 1 except that the lactated glyceride has a mole ratio of lactic acid to fatty acid of about .6:1 and the mole ratio of total acid to glycerine is about 2.8:1. The fatty acids in the lactated glyceride had less than one I.V., that is to say they were substantially saturated. The fatty acids primarily comprised palmitates. The cake resulting from the use of this liquid shortening has a volume of about 1200 cubic centimeters and has good cake characteristics.

In each of the foregoing examples, the ingredients were merely mixed together. Because of the solubility of the surface active agent and because of the solubility of the lactated glycerides in the base oil, the ingredients of the liquid shortening need only be warmed and stirred together. This is an advantage of the invention in that it is not necessary to substantially heat or cool in any particular way the ingredients in order to provide the liquid shortening, as is the case with various liquid shortening products.

The use of the reaction product alone with the base oil does not provide a satisfactory cake. In this connection, the resulting cakes have depressed centers which cause the cakes to be unsatisfactory. The synergistic action between the surface active agent and the reaction product of this invention is not wholly understood but, it is clear that the product provides a good liquid shortening.

It will be understood, of course, that various coloring agents may be added to provide a desired color to the liquid shortening. In this connection, beta carotene may be added for coloring purposes. Such coloring would be added to a level to provide the desired color and it has been found that a satisfactory color may be provided by adding .0006 percent beta carotene.

It will also be understood that various antioxidants or stabilizers can be added to protect the liquid shortening for extended periods of time against deterioration. Such stabilizers are well known to those familiar with the art and protect the oil from deteriorating in flavor and quality. A highly satisfactory stabilizer is sold under the trade name "Tenox VI." It has been found that a level of .07 percent of such stabilizer will provide the desired stability to the liquid shortening of this invention.

The shortening may also include a fluidizing agent in order to promote and maintain fluidity. A most satisfactory example is an aluminum trisoap of a higher saturated fatty acid, the fatty acid having a carbon chain of at least 16 carbon atoms. The fluidizing agent should be present in the amount which maintains fluidity of the product at about room temperatures and below, and, in general, will be present at a level in excess of about .01 percent. Amounts in excess of .3 percent do not appear to provide further improvement. A particularly satisfactory agent is aluminum tri-palmitate.

The liquid shortening product of this invention provides highly satisfactory characteristics which are comparable to that provided with the use of plastic shortenings. The product does not separate upon standing and can be very readily prepared, as above indicated. The liquid shortening may be readily measured and can be used as a substitute for plastic shortening in recipes and for various cooking purposes. It is, of course, quite useful for frying purposes.

It will be apparent to those familiar with the art that various compounds can be used in accordance with this invention and such compounds are within the scope of this specification.

The various features of the invention which are believed to be new are set forth in the following claims.

I claim:

1. The combination as a liquid shortening of an edible liquid oil, a surface active agent comprising at least one compound selected from the group consisting of partial esters of the fatty acids with hexahydric alcohols or their anhydrides, polyoxalkylene derivatives of the partial esters of fatty acids with hexahydric alcohols or their anhydrides, and ester-ethers resulting from the reaction of fatty acids with alkylene oxides, and a reaction product, the sum of percentages of said surface active agent and said reaction product being between about 2 and about 8 percent by weight of said shortening; said oil having an iodine value in excess of about 85 and being substantially free of tri-saturated components, said surface active agent being present in an amount between about .1 and about 2.0 percent, said reaction product consisting essentially of glycerine combined with substantially saturated fatty acid radicals having carbon chains in excess of 12 and an iodine value no higher than 35 and with a water soluble acid having the general formula:

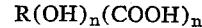

$$R(OH)_n(COOH)_n$$

wherein R is a hydrocarbon group having from 1 to 5 carbon atoms and $n$ is 1 or 2, said water soluble acid to fatty acid ratio in the preparation of said reaction product being from 0.4:1 to 2.5:1 and the total acid to glycerine ratio being from 1.5:1 to 3.0:1, said reaction product being formed by mixing said fatty acid and said water-soluble acid together with said glycerine and reacting the mixture at elevated temperature, said reaction product being present in an amount from about 2 percent to about 6 percent by weight.

2. The combination as a liquid shortening of an edible liquid oil, a surface active agent comprising at least one compound selected from the group consisting of partial esters of the fatty acids with hexahydric alcohols or their anhydrides, polyoxyalkylene derivatives of the partial esters of fatty acids with hexahydric alcohols or their anhydrides, and ester-ethers resulting from the reaction of fatty acids with alkylene oxides, and a reaction product, the sum of percentages of said surface active agent and said reaction product being between about 2 and about 8 percent by weight of said shortening; said oil having an iodine value in excess of about 85 and being substantially free of tri-saturated components, said surface active agent being present in an amount between about .1 and about 2.0 percent, said reaction product consisting esentially of glycerine with substantially saturated fatty acid radicals having carbon chains in excess of 12 and an iodine value no higher than 35 and combined with lactic acid, said water-soluble acid to fatty acid ratio in the preparation of said reaction product being from 0.4:1 to 2.5:1 and the total acid to glycerine ratio being from 1.5:1 to 3.0:1, said reaction product being formed by mixing said fatty acid and said water-soluble acid together with said glycerine and reacting the mixture at elevated temperature, said reaction product being present in an amount of from about 2 percent to about 6 percent by weight.

3. The combination as a liquid shortening of an edible liquid oil, a surface active agent comprising at least one compound selected from the group consisting of partial esters of the fatty acids with hexahydric alcohols or their anhydrides, polyoxyalkylene derivatives of the partial esters of fatty acids with hexahydric alcohols or their anhydrides, and ester-ethers resulting from the reaction of fatty acids with alkylene oxides, and a reaction product, the sum of percentages of said surface active agent and said reaction product being between about 2 and about 8 percent by weight of said shortening; said oil having an iodine value in excess of about 85 and being substantially free of tri-saturated components, said surface active agent being present in an amount between about .1 and about 2.0 percent, said reaction product being present in an amount of from about 2 to about 6 percent by weight and consisting essentially of glycerine combined with substantially saturated fatty acid radicals having carbon chain lengths in excess of 12 and an iodine value no higher than 35, and primarily with palmitic acid and combined with lactic acid to form glyceryl lactopalmitate, said water-soluble acid to fatty acid ratio in the preparation of said reaction product being from 0.4:1 to 2.5:1 and the total acid to glycerine ratio being from 1.51:1 to 3.0:1, said reaction product being formed by mixing said fatty acid and said water-soluble acid together with said glycerine and reacting the mixture at elevated temperature.

References Cited in the file of this patent

UNITED STATES PATENTS

| | | |
|---|---|---|
| 2,266,591 | Eckey et al. | Dec. 16, 1941 |
| 2,480,332 | Little | Aug. 30, 1949 |
| 2,509,414 | Barsky | May 30, 1950 |
| 2,690,971 | Iveson et al. | Oct. 5, 1954 |
| 2,746,868 | Cross et al. | May 22, 1956 |
| 2,864,703 | Schulman | Dec. 16, 1958 |